Patented July 9, 1935

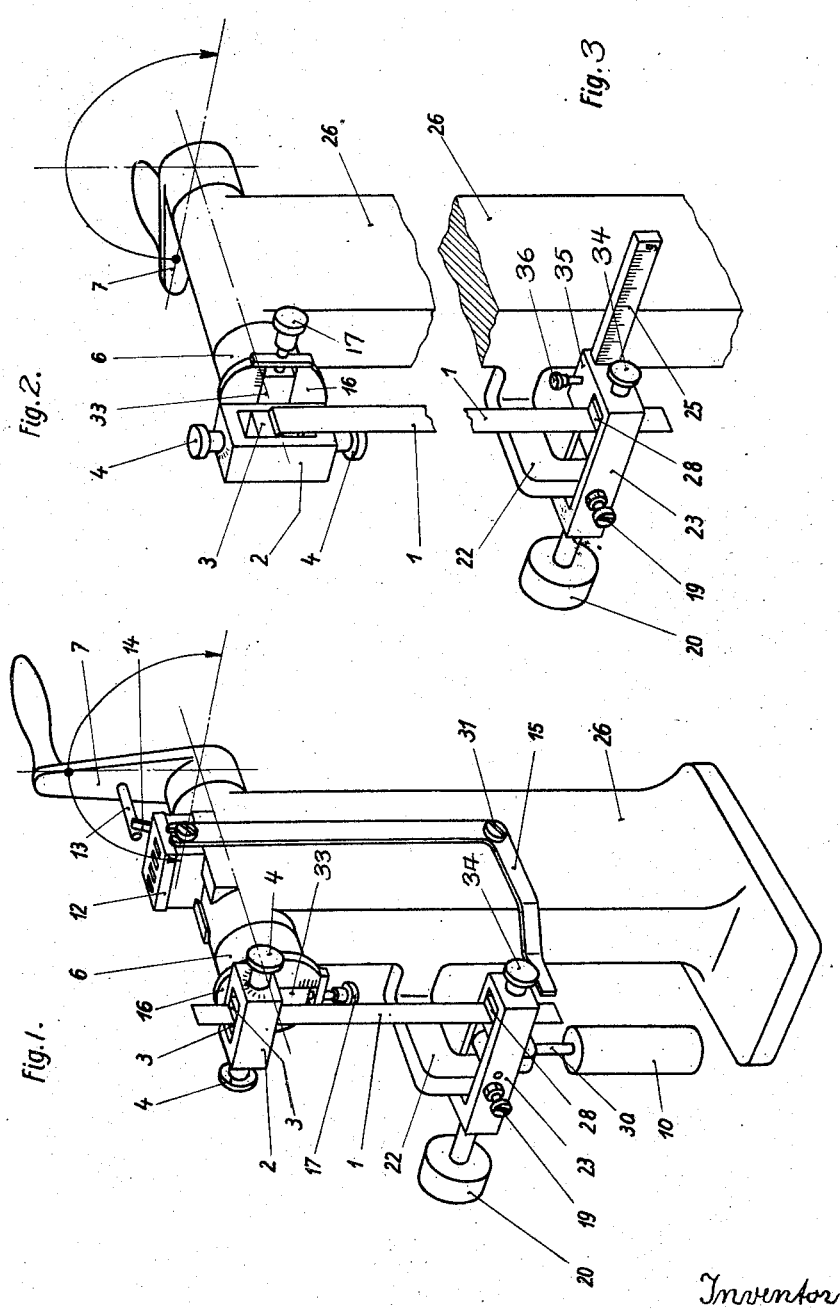

2,007,286

UNITED STATES PATENT OFFICE 2,007,286

FLEXURE TESTING MACHINE

Alfred Schopper, Leipzig, Germany

Application July 30, 1932, Serial No. 626,577
In Germany May 25, 1932

4 Claims. (Cl. 73—51)

My invention relates to a testing machine, and more particularly to a machine for testing pieces by repeated flexure.

It is an object of my invention to provide an improved testing machine for the purpose specified. To this end I provide means for holding a test piece at one end, while its other end is supported so as to undergo flexure. The flexing means comprise a shaft, a clamp which is mounted for radial displacement on the shaft, for instance, fitted to slide in a slot of a crank disk on the shaft, and is equipped with means such as a pair of jaws for engaging the test piece with knife edges. The knife edges of the jaws support the free end of the test piece, while its other end is held by the holding means, and means are provided for adjusting the clamp so as to place the point, where the test piece is supported by the knife-edged jaws, in line with the axis of the shaft. The test piece is flexed by oscillating the shaft about its axis.

It is another object of my invention to provide means for exerting tensile stress on the test piece during the repeated-bending test. To this end, I provide means for connecting a weight to the portion of the test piece which is below the supporting point.

It is still another object of my invention to regulate the tensile stress exerted on the piece. To this end, I provide means for varying the force exerted on the test piece by the weight.

In the drawing affixed to this specification and forming part thereof, a flexure testing machine embodying my invention is illustrated diagrammatically by way of example.

In the drawing

Fig. 1 is a perspective illustration of the machine showing its clamp in horizontal position, Fig. 2 shows the upper end of the machine with the clamp in one of its vertical positions, and Fig. 3 is a perspective illustration showing means for weighting the lower end of the test piece and for varying the force exerted by the weight.

Referring now to the drawing, and first to Figs. 1 and 2, 26 is an upright or frame, and 6 is a shaft which is mounted to oscillate at the upper end of the frame. Any suitable means, mechanical or electrical, may be provided for oscillating the shaft through 180 degs. as indicated by the arrows, or through any other angle. In the present instance, a handle 7 is secured on the outer end of the shaft for operating it. Secured on the inner end of the shaft 6 is a crank disk 16, 2 is a rectangular clamp at the free end of the crank disk 16, 33 is a lug at the inner end of the clamp 2 which is mounted to slide radially in a diametrical slot of the crank disk 16, and means, such as a micrometric screw 17, are provided for the exact adjustment of the clamp 2 with its lug 33 in the slot of the crank disk 16, 3, 3 are jaws in the clamp for engaging the test piece 1, here shown as a flat strip through the medium of knife edges, and 4, 4 are screws for holding the knife edges of the jaws 3, 3 engaged with opposite faces of the strip 1.

The clamp 2 is adjusted on the disk 16 so that the knife edges of its jaws are at the level of, and parallel to, the axis of the shaft 6, i. e. the bending or supporting point is in line with the axis. The micrometer screw 17 as mentioned, is provided for the exact adjustment of the lug 33 in the slot of the disk 16.

Tension is exerted on the strip 1 by a weight 10 on a beam 23 which is mounted to rock about a pivot 19 in a lug 22 of the upright 26. The weight 10 is connected to the beam 23 at one side of its pivot 19, and 20 is a weight on the opposite side of the beam. The beam 23 is a substantially rectangular frame, with the jaws 28 in the arm from which the weight 10 is suspended, and a set screw 34 for applying the jaws to the test piece. The weight of the jaws 28 is balanced by the weight 20. The tension may be varied by exchanging the weight 10 or by applying additional weights (not shown). The beam 23 rocks about its pivot 19 in the plane in which the test piece is flexed so that any irregularities are eliminated and only bending stress is exerted on the strip 1. The elimination of the torsional forces on the strip is particularly important. 12 is a counter on the upright 26, 13 is a pin projecting from the inner face of the handle 7, and 14 is an arm on the counter which is operated by the pin 13 once per oscillation of the shaft 6 for actuating its counting mechanism.

A bellcrank 15 for throwing out the counter 12 is operated by the set screw 34 on the beam 23 when the strip 1 breaks. In Fig. 2, the counter has been omitted.

Referring now to Fig. 3, the weight 10 is replaced by a graduated weighting bar 25. The weighting bar 25 is mounted to slide in a lug 35 at that end of the beam 23 which is opposite the weight 20, and held in position by a set screw 36. By shifting the bar 25 in its lug 35 and securing it by the set screw 36, the tensile stress on the strip 1 may be varied.

I wish it to be understood that I do not desire to be limited to the exact details of construction shown and described, for obvious modifications will occur to a person skilled in the art.

I claim:

1. A flexure testing machine, comprising means for holding a test piece at one end, a shaft, a clamp mounted for radial displacement on said shaft, means on said clamp for supporting the free end of said test piece, means for adjusting said clamp so as to place its supporting point in line with the axis of said shaft, and means for oscillating said shaft.

2. A flexure testing machine, comprising means for holding a test piece at one end, a shaft, a clamp mounted for radial displacement on said shaft jaws in said clamp having knife edges for engaging the free portion of said test piece, means for adjusting said clamp so that its knife edges extend at the level of, and parallel to, the axis of said shaft, and means for oscillating said shaft about its axis.

3. A flexure testing machine, comprising a frame, a beam pivotally mounted on said frame, means on said beam for engaging the lower end of a test piece, a weight secured to said beam at one side of its pivot for balancing the weight of said piece-engaging means, a weight secured to said beam at the opposite side of its pivot for loading the test piece, a shaft mounted for oscillation in said frame, a clamp mounted on said shaft, means on said clamp for supporting the free end of said test piece, and means for oscillating said shaft.

4. A flexure testing machine, comprising a frame, a beam pivotally mounted on said frame so as to rock in the plane in which a test piece is flexed, means on said beam for engaging the lower end of said test piece, weights connected to said beam at opposite sides of its pivot, a shaft mounted for oscillation in said frame, a clamp mounted on said shaft, means on said clamp for supporting the free end of said test piece, and means for oscillating said shaft.

ALFRED SCHOPPER.